United States Patent [19]
Fieres et al.

[11] Patent Number: 6,148,083
[45] Date of Patent: Nov. 14, 2000

[54] APPLICATION CERTIFICATION FOR AN INTERNATIONAL CRYPTOGRAPHY FRAMEWORK

[75] Inventors: Helmut Fieres, Mountain View; Roger Merkling; Keith Klemba, both of Palo Alto, all of Calif.

[73] Assignee: Hewlett-Packard Company, Palo Alto, Calif.

[21] Appl. No.: 08/702,331

[22] Filed: Aug. 23, 1996

[51] Int. Cl.[7] ........................................ H04L 9/00
[52] U.S. Cl. .......................... 380/255; 380/9; 380/23; 380/49; 380/50; 380/59
[58] Field of Search ................... 380/1, 2, 3, 4, 380/9, 23, 25, 29, 30, 49, 50, 59; 395/670; 711/164

[56] References Cited

U.S. PATENT DOCUMENTS 4,104,721  8/1978  Markstein et al. ..................... 711/164
5,164,988  11/1992  Matyas et al. ........................... 380/25
5,339,417  8/1994  Connell et al. ......................... 395/670
5,651,068  7/1997  Klemba et al. .......................... 380/25

*Primary Examiner*—Bernarr E. Gregory

[57] ABSTRACT

An application which requests cryptographic services from various service elements within an international cryptography framework is identified through a certificate to protect against the misuse of a granted level of cryptography. A cryptographic unit, one of the framework core elements, builds several certification schemes for application objects. One or more methods are provided that establish a degree of binding between an application code image and issued certificates using the framework elements. Within the framework, the application is assured of the integrity of the cryptographic unit from which it is receiving services. One or more mechanisms are provided which allow the application to validate that the cryptographic unit has not been replaced or tampered with.

31 Claims, 11 Drawing Sheets

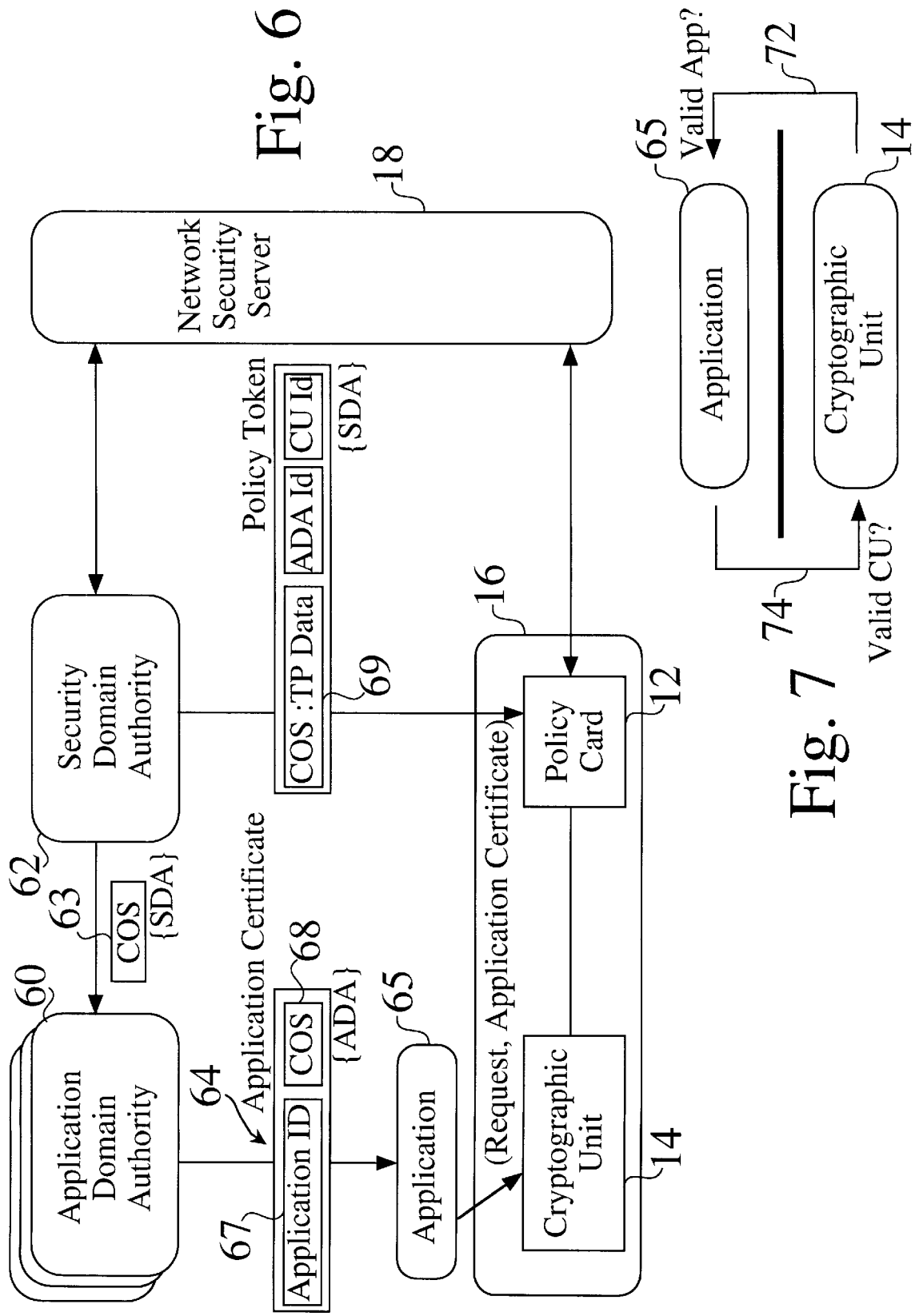

APPLICATION CERTIFICATION FOR AN INTERNATIONAL CRYPTOGRAPHY FRAMEWORK

BACKGROUND OF THE INVENTION

1. Technical Field

The invention relates to cryptography. More particularly, the invention relates to a mechanism for validating an application image as it is installed on a system with respect to the binding of the application to a certificate, as well as validating the system service element upon which the application image is installed.

2. Description of the Prior Art

Customers of large computer systems are typically multinational corporations that want to purchase enterprise wide computer based solutions. The distributed nature of such organizations requires them to use public international communications services to transport data throughout their organization. Naturally, they are concerned about the security of their communications and seek to use modern end-to-end cryptographic facilities to assure privacy and data integrity.

The use of cryptography in communications is governed by national policy and unfortunately, national policies differ with respect to such use. Each national policy is developed independently, generally with a more national emphasis rather than international considerations. There are standards groups that are seeking to develop a common cryptographic algorithm suitable for international cryptography. However, the issue of international cryptographic standards is not a technical problem, but rather it is a political issue that has national sovereignty at its heart. As such, it is not realistic to expect the different national cryptography policies to come into alignment by a technical standardization process.

The issue of national interests in cryptography is a particular concern of companies that manufacture open-standards-based information technology products for a worldwide market. The market expects these products to be secure. Yet, more and more consumers of these products are themselves multinational and look to the manufacturers to help them resolve the international cryptography issues inhibiting their worldwide information technology development. The persistence of unresolved differences and export restrictions in national cryptography policies has an adverse impact on international market growth for secure open computing products. Thus, it would be helpful to provide an international framework that provides global information technology products featuring common security elements, while respecting the independent development of national cryptography policies.

Nations have reasons for adopting policies that govern cryptography. Often these reasons have to do with law enforcement and national security issues. Within each country there can be debates between the government and the people as to the rightness and acceptability of these policies. Rather than engage in these debates or try to forecast their outcome, it is more practical to accept the sovereign right of each nation to establish an independent policy governing cryptography in communication.

Policies governing national cryptography not only express the will of the people and government, but also embrace certain technologies that facilitate cryptography. Technology choice is certainly one area where standardization can play a role. However, as indicated earlier this is not solely a technical problem, such that selection of common cryptographic technologies alone can not resolve the national policy differences.

A four-part technology framework that supports international cryptography, which includes a national flag card, a cryptographic unit, a host system, and a network security server is disclosed by K. Klemba, R. Merckling, *International Cryptography Framework,* in a copending U.S. patent application Ser. No. 08/401,588, which was filed on Mar. 8, 1995, now U.S. Pat. No. 5,651,068.

The framework supports the design, implementation, and operational elements of any and all national policies, while unifying the design, development, and operation of independent national security policies. The framework thus gives standard form to the service elements of national security policies, where such service elements include such things as hardware form factors, communication protocols, and on-line and off-line data definitions.

FIG. 1 is a block diagram of the international cryptography framework 10, including a national flag card 12, a cryptographic unit 14, a host system 16, and a network Security server 18. Three of the four service elements have a fundamentally hierarchical relationship. The National Flag Card (NFC) is installed into the Cryptographic Unit (CU) which, in turn, is installed into a Host System (HS). Cryptographic functions on the Host System cannot be executed without a Cryptographic Unit, which itself requires the presence of a valid National Flag Card before it's services are available. The fourth service element, a Network Security Server (NSS), provides a range of different security services including verification of the other three service elements, and thus acts as a trusted third party.

FIG. 2 is a perspective view showing the four basic elements of the framework, including the cryptographic unit 14 and several national flag cards 12, a host system 16, and a national security server 18. In the following sections each service element is discussed in greater detail.

NATIONAL FLAG CARD (NFC). The NFC 12 is a small stamp sized (25×15 mm) ISO 7816-type smart card, i.e. a one chip computer 26 having a non-volatile memory. The NFC is mounted on a rigid substrate and sealed in a tamper-proof package. The NFC is typically produced independently and distributed by National agencies (e.g. United States Postal Service, German Bundespost). National agencies may also license NFC production and distribution to private industry.

The action of the NFC service element is to enforce a nation's policy governing the use of cryptography. An NFC is a complete computer that can be constructed as a multi-chip architecture to include custom integrated circuits. It also would include tamper resistance and unique identification features, making unauthorized entry or duplication impossible. For example, the NFC could be sealed in such a way that opening its package would destroy any integrated circuit or data inside. The NFC could require receipt of an encrypted authorization issued by the National Security Server. All services of the NFC are provided via standard ISO 7816 message exchanged protocol between the NFC and other service elements. This format is identical to the smart card used in Europe to support GSM in cellular voice services.

CRYPTOGRAPHIC UNIT (CU). The cryptographic unit is a tamper-resistant hardware component designed to provide protected cryptographic services under the strict control of an NFC. Cryptographic units would be produced competitively by system vendors and third parties and be free of import and export restrictions. Because the cryptographic unit includes critical elements of security such as encryption algorithms and keys, it is likely that it would be certified (e.g. NIST, NCSC, or ITSEC Certified) for customer assurance. It is a feature of this embodiment of the invention that the cryptographic unit does not contain any governing policy other than its dependence upon a NFC. This component is preferably designed for performance and protection with customization for a given Host System.

HOST SYSTEM (HS). The HS is identifiable as the hardware component that delivers secure information technology services directly to the user. HSs are typically a general purpose information technology device and would be produced competitively in a wide open market. Examples include personal digital assistants, personal computers, workstations, laptops, palmtops, networked servers, main frames, network printers, or video display units, as well as embedded systems for control and measurement. The function of the HS service element in the framework is to provide an Application Programming Interface (API) for accessing the cryptographic unit service element. Preferably, cryptographic unit support is provided as an option available on the HS.

NETWORK SECURITY SERVER (NSS). The NSS is a network node designed and designated to provide trusted third party Security services. For example, any network access, such as via modems 30, 32 over a network 34, must be authenticated by the NSS. In the context of national security, NSSs are preferably developed, owned, and operated by government agencies. Some of the functions provided by the NSS service element include service element authentication, message stamp authentication, national policy enforcement, and cryptographic key distribution. The importance of the NSS can rise sharply in environments where a strong degree of verification is prerequisite to cryptographic use. The NSS also plays a significant role in the interoperability of differing National cryptographic policies.

Scope Of The Framework. The scope of the framework is largely defined by the scope of the NFCs. The basic scope of the NFCs is that of a domain. A domain can be as large as worldwide and as small as a business unit. At the domain level there is no unique distinction among its members. While this framework primarily focuses on national and international domains (e.g. France, Germany, United States, United Kingdom, European Commission, NATO, North America, G7) other domains or sub-domains are also considered. For example, industry domains (e.g. Telecom, Healthcare, Financial Services, Travel), corporate domains (e.g. Hewlett-Packard, Ford Motor Company, CitiBank), association domains (e.g. IEEE, ISO, X/Open), service domains (e.g. Compuserve, America On-Line), and product domains (e.g. Lotus, Microsoft, General Motors, Proctor & Gamble).

Beyond domains and subdomains the scope of the framework can optionally be expanded to define uniqueness within a domain. Again it is the NFCs that make this narrower scope possible. Providing uniqueness means allowing for the transfer of unique or personal data to be transferred to the NFC either at the time of purchase or at the point of initial validation. NFCs are considered anonymous when dealing at the domain level. When uniqueness is added, NFCs are no longer anonymous.

Interconnect Of Framework Elements. The interconnection of service elements (e.g. NFC, CRYPTOGRAPHIC UNIT, HS, NSS) of this framework is accomplished by the adoption of standard Application Programming Interfaces (e.g. X/Open, OSF) and industry standard protocol exchanges (e.g. TCP/IP, ISO, DCE, X.509). The interconnection of elements may be synchronous (i.e. on-line), asynchronous (i.e. off-line), local (e.g. runtime library), remote (e.g. RPC) or any combination of these. For example, a policy that involves personalization of NFCs could perform a one time authorization function via a NSS making it unnecessary for future on-line verification with an NSS until the NFC expires.

Beyond the physical interconnection of the framework's service elements lies the message exchange between the elements and the actual services provided and requested via this message exchange. FIG. 3 illustrates the message exchange paths, between an NFC 12 and a cryptographic unit 14 (path 35), between the cryptographic unit 14 and an HS 16 (path 36), and between the HS 16 and an NSS 18 (path 37). A virtual connection 38 exists between the NFC and the NSS. Messaging protocol between the HS and the cryptographic unit along the path 36 are best taken from cryptographic API standardization efforts (e.g. NSAs Cryptographic API, Microsoft's Cryptographic API). The messaging protocol between the cryptographic unit and the NFC along the path 35 is categorized into two groups: initialization protocols, and operational protocols. The initialization protocols must be successful before operational protocols are active.

Consequently, it would be useful to provide a common, accepted cryptography framework, wherein independent technology and policy choices can be made in a way that still enables international cryptographic communications consistent with these policies. Critical to the implementation of the framework is the provision of a fundamental technology that allows the production of the various service elements. While various implementations of the service elements are within the skill of those versed in the relevant art, there exists a need for specific improvements to the state of the art if the full potential of the framework is to be realized.

For example, it would be advantageous to include within the framework a system the establishes that an application is a legitimate application having authorization for a requested class of service. It would also be advantageous for the application to verify that the service element is a legitimate recipient of the application image and service requests. It would additionally be advantageous if such system operated in accordance with a Security paradigm that required at least a tamper proof transport mechanism, such as a certificate, and a mechanism for establishing and maintaining continuity during a particular transaction.

SUMMARY OF THE INVENTION

The invention resides within a secure system, such as an international cryptography framework, for example which allows manufacturers to comply with varying national laws governing the distribution of cryptographic capabilities. In particular, such a framework makes it possible to ship worldwide cryptographic capabilities in all types of information processing devices (e.g. printers, palm-tops). Within the framework, a cryptographic unit contains several cryptographic methods (e.g. DES, RSA, MD5).

It is a fundamental requirement of the framework that an application which requests cryptographic services from the framework service elements is identified through some form of certificate to protect against the misuse of the granted level of cryptography. The cryptographic unit, one of the framework core elements, can be used to build several certification schemes for application objects. The invention provides various methods that establish a degree of binding between an application code image and issued certificates using the framework elements.

Another fundamental requirement of the framework is that the application is assured of the integrity of the cryptographic unit from which it is receiving services. The invention provides various mechanisms that allow the application to validate that the cryptographic unit has not been replaced or tampered with.

BRIEF DESCRIPTION OF THE DRAWINGS

FIG. 6 is a block diagram of the key elements of a policy scheme in which an application is granted a class of services by an application domain authority, where such class of services ultimately define the level of cryptography allowed in the application according to the invention;

FIG. 7 is a block diagram that illustrates the certification requirements of a framework according to the invention;

DETAILED DESCRIPTION OF THE INVENTION

Figure 1:
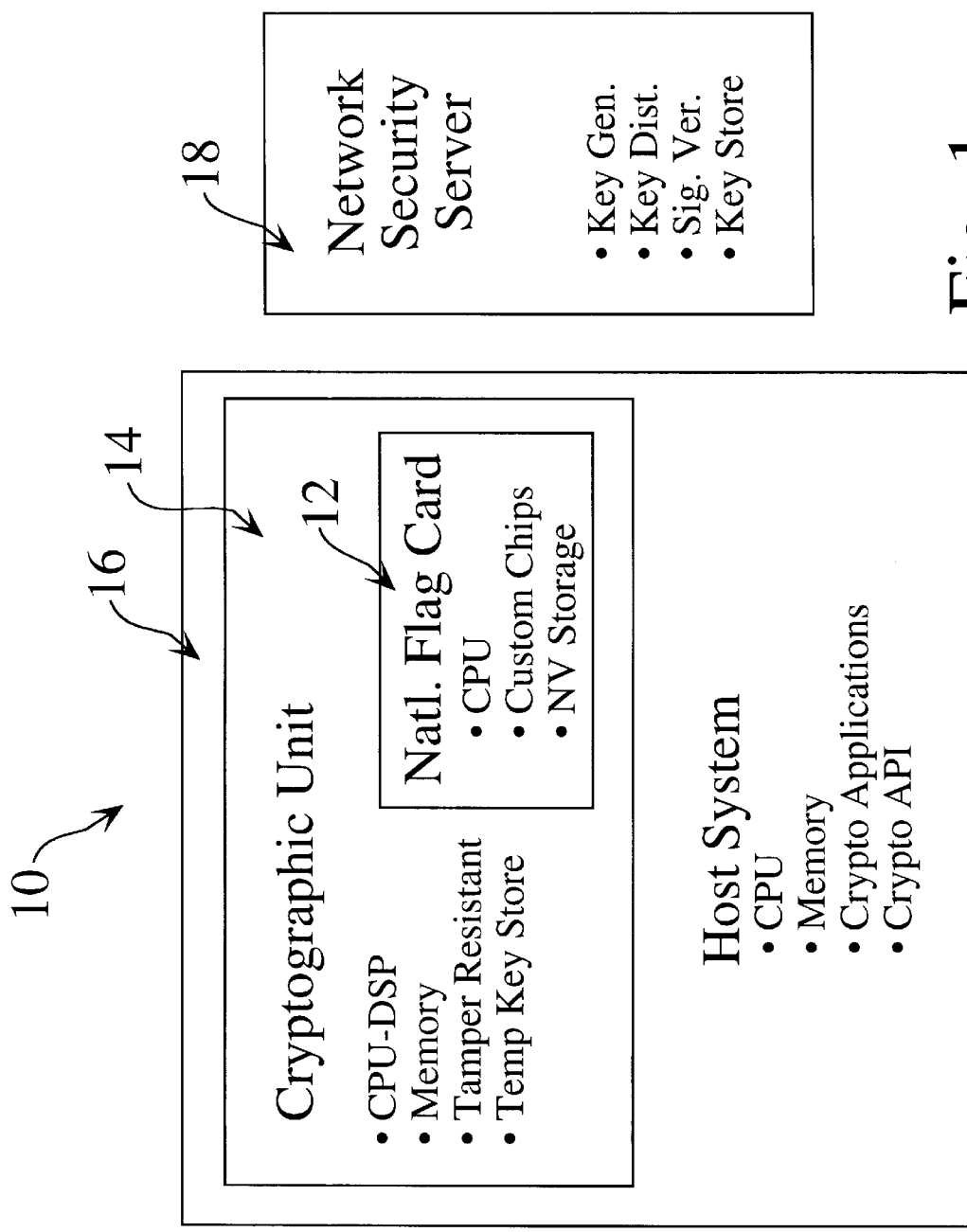
FIG. 1 is a block diagram of an international cryptography framework, including a national flag card, a cryptographic unit, a host system, and a network security server.
Figure 2:
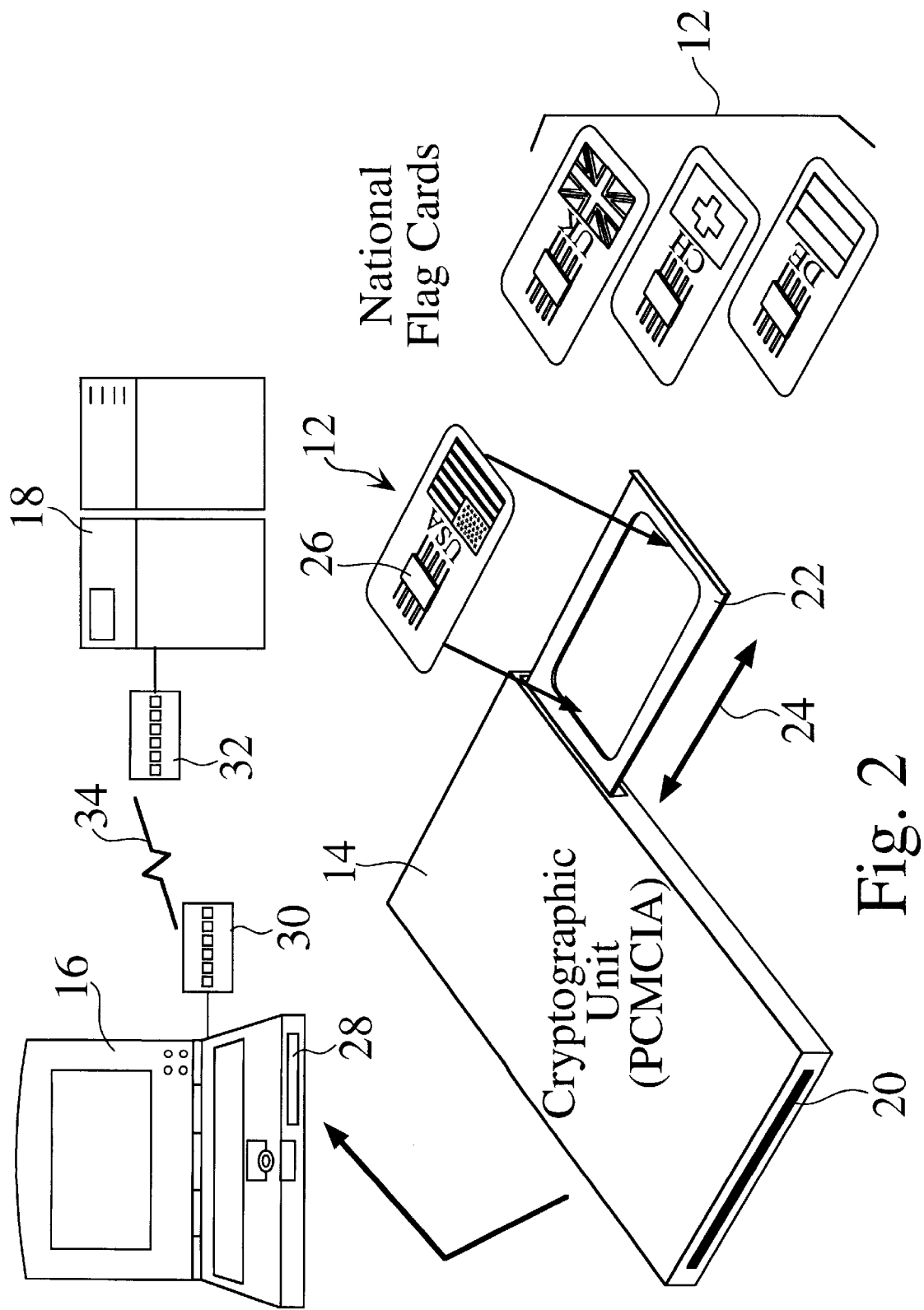
FIG. 2 is a perspective view showing the four basic elements of the framework, including a cryptographic unit and several national flag cards, a host system, and a national security server.
Figure 3:
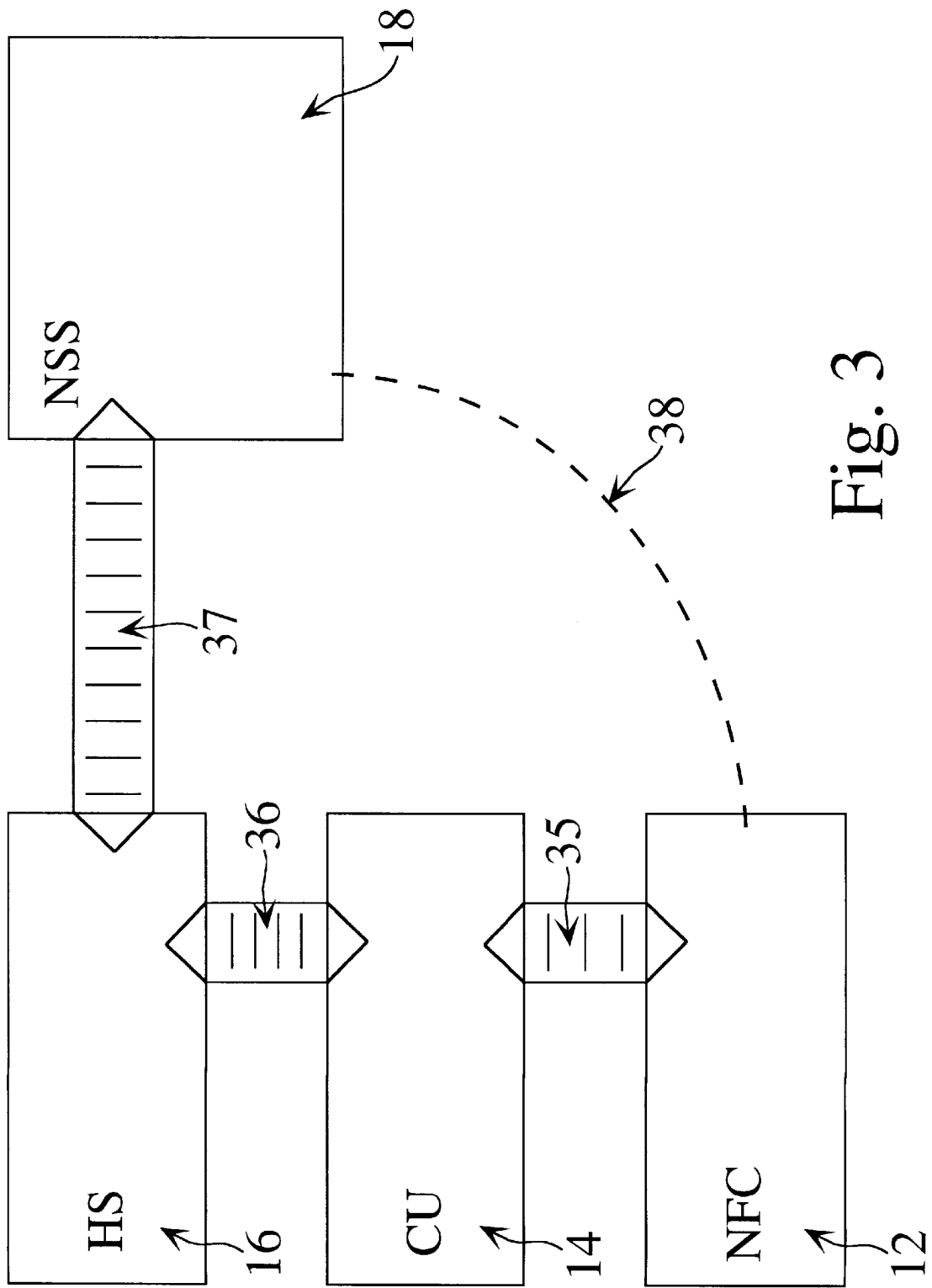
FIG. 3 illustrates the message exchange paths, between an NFC and a CU, between a CU and an HS, and between an HS and an NSS.

National cryptography policy often varies by industry segment, political climate, and/or message function. This makes it difficult to assign one uniform policy across all industries for all time. Consequently, the flexibility of a cryptography framework that incorporates a national flag card is very attractive. The invention is therefore primarily directed to resolving problems surrounding international cryptography. However, the invention is readily applicable to any environment that requires validation of an application's authenticity and/or privilege; and that requires that the application be assured that it is using the services of an authorized secure, cryptographic processor.

The preferred embodiment of the invention is concerned with application certification within a framework such as that disclosed by K. Klemba, R. Merckling, *International Cryptography Framework,* in a copending U.S. patent application Ser. No. 08/401,588, which was filed on Mar. 8, 1995, now U.S. Pat. No. 5,651,068. It is a fundamental requirement of the framework that an application which requests cryptographic services from the framework service elements is identified through some form of certificate to protect against the misuse of the granted level of cryptography. The cryptographic unit, one of the framework core elements, can be used to build several certification schemes for application objects. The invention provides various methods that establish a degree of binding between an application code image and issued certificates using the framework elements.

Another fundamental requirement of the framework is that the application is assured of the integrity of the cryptographic unit from which it is receiving services. The invention provides various mechanisms that allow the application to validate that the cryptographic unit has not been replaced or tampered with.

As discussed above, the framework allows manufacturers to comply with varying national laws governing the distribution of cryptographic capabilities. In particular, such a framework makes it possible to ship worldwide cryptographic capabilities in all types of information processing devices (e.g. printers, palmtops).

The four basic elements of framework (as discussed above) are listed below with a brief description of each.

Cryptographic Unit. The system or unit that contains a cryptographic unit supports an application programming interface to a cryptographic unit. It also supports applications that are security aware and that use the cryptographic unit. These applications and/or subsystem layers are bound tightly to the cryptographic unit by use of a certificate.

The cryptographic functions are dormant and cannot be used by the host system until activated by a policy. The cryptographic functions that are included in the cryptographic unit are determined by the requirements of the application in which the invention is used. The cryptographic unit is tamper resistant to protect any keys that may be stored therein. It is the responsibility of the cryptographic unit to maintain contact with a policy. Failing to do so results in the decay of the cryptographic unit.

Policy (also referred to a the "National Flag Card" and "Policy Card"). The policy is the system or unit that contains cryptography usage policy. Specifically this element of framework contains parameters that govern the use of cryptography in a specific cryptographic unit. Furthermore, this element is responsible for responding to a cryptographic unit heartbeat challenge.

Network Security Server. The network security server is the system or unit that acts as a trusted third party to provide networked services to host systems, cryptographic unit, and policies. These services Include, for example, policy enhancements, unit verification, adjustments to authorizations, and key management services.

The framework architecture rests on the following basic assumptions about the core elements:

The cryptographic unit cannot provide the host system with any cryptographic functions without being in contact with a policy.

The policy has no access to user data being processed within the cryptographic unit.

The cryptographic unit(s) which is controlled by a given policy is deterministic, i.e. every event, act, and decision of the cryptographic unit is the inevitable consequence of antecedents that are independent of the policy.

The cryptographic unit or policy can request services of a national security server.

One key element of the framework is the cryptographic unit. An implementation of the cryptographic unit provides a set of services to the host system, as follows:

Cryptographic functions. The main purpose of the cryptographic unit is to provide cryptographic functions. The unit hosts hardware and software to carry out the defined cryptographic algorithms. It also hosts hardware and software which enforce a certain cryptographic policy.

Secure storage. Secure storage allows the storage of information in a secure manner inside the cryptographic unit. This facility is primarily used for the storage of key material inside the cryptographic unit. Over time, application and subsystem layers may also take advantage of this facility by storing other non-security related material inside the cryptographic unit.

Secure execution. The cryptographic unit allows for the execution of code in the secure unit and tamper-resistant environment of that unit. Applications and subsystem layers may take advantage of this facility to implement a portion of their functionality, such as security protocol handlers, in this secure environment.

Figure 4:
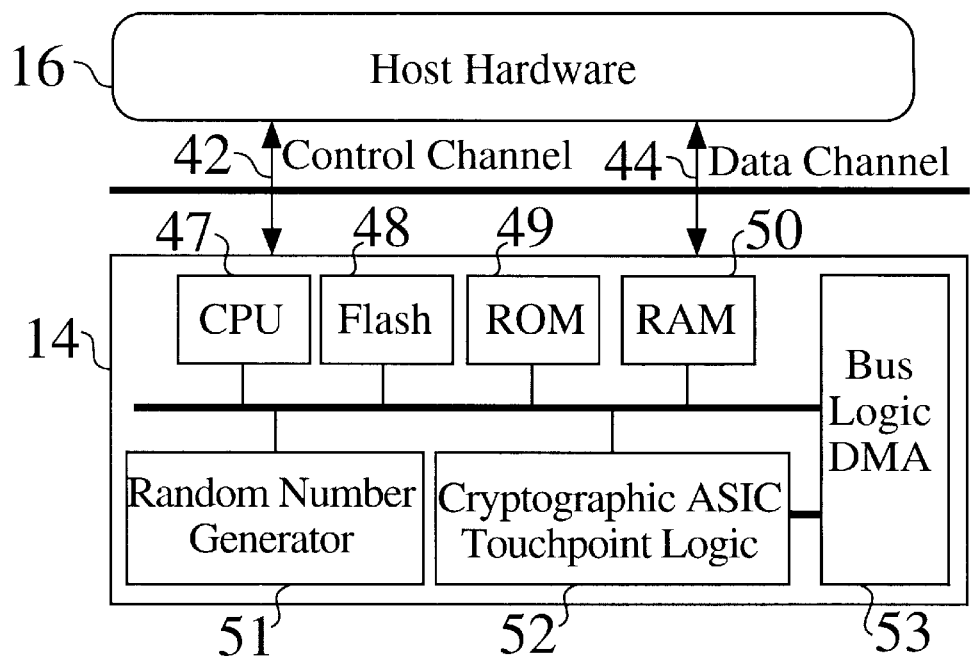
FIG. 4 is a block schematic diagram of a cryptographic unit according to the invention.

FIG. 4 is a block schematic diagram of a cryptographic unit architecture. The figure does not refer to a specific physical implementation, but shows the main elements required inside the cryptographic unit to implement this element of a preferred embodiment of the invention.

There are several components which form the cryptographic unit 14, as follows:

Central Processing Unit (CPU). The CPU 47 controls all information flow. Modules downloaded for secure execution are executed by the CPU.

Storage Elements. The cryptographic unit needs several storage elements.

The flash memory 48 is the storage for programs and nonvolatile data stored in the cryptographic unit.

The ROM storage 49 hosts the bootstrap code which executes on reset of the cryptographic unit.

The RAM storage 50 holds the volatile data of the cryptographic unit.

Cryptographic ASIC 52 and random number generator 51. These two elements perform the basic operations for the cryptographic functions offered by the cryptographic unit. For example, framework touch point logic (for example, as described in U.S. Pat. No. 5,710,814, issued Jan. 20, 1998, entitled *Cryptographic Unit Touch Point Logic*, can be found in these elements for enabling their functions in the presence of a policy card.

Bus Logic. The bus logic 53 interfaces the unit with various interfaces to the host system 16. Two main channels exit towards the host system. The control channel 42 is used for commands and status messages between the calling system and the cryptographic unit.

The data channel 44 performs the actual data transfer.

Figure 5:
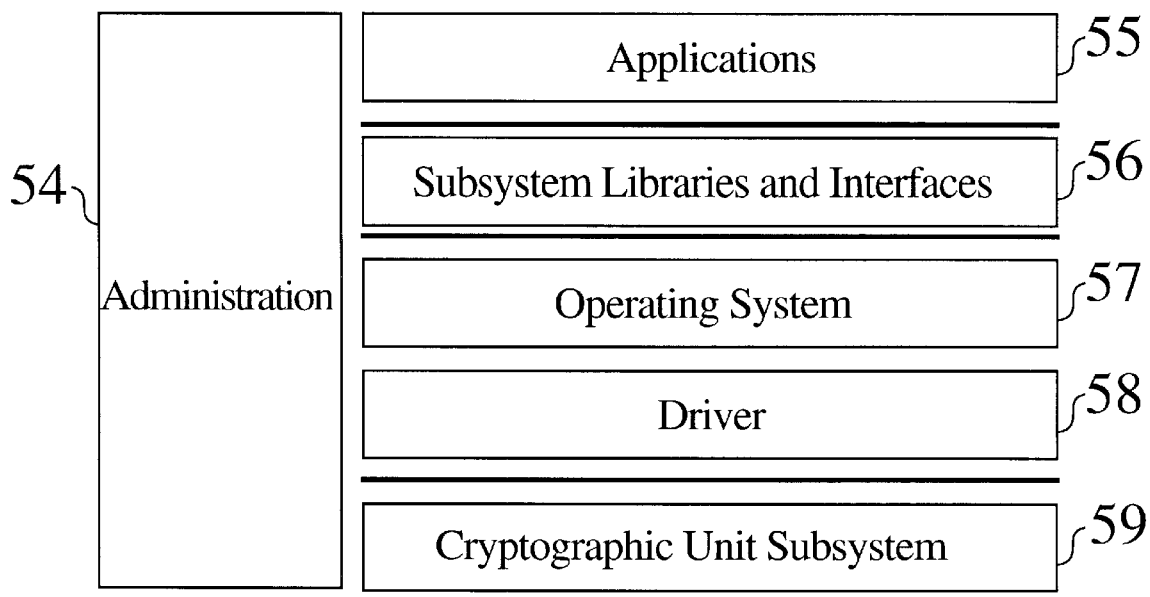
FIG. 5 is an overview of the main software architecture elements of a framework according to the invention.

The framework software architecture describes the layers of libraries and system elements which are needed to implement the framework elements on a given host system. FIG. 5 provides an overview of the main software architecture elements.

Applications. The application layer 55 is the area of user written applications and libraries which need cryptographic services. Applications may or may not be aware of these services. In case they are aware, the subsystem layer 56 below offers a set of programming interfaces to the application. Cryptographically unaware applications do not issue any calls themselves, the underlying subsystem performs these calls on behalf of the application.

Subsystem Libraries And Interfaces. Subsystems 56 which support cryptographic functions for aware and unaware applications also provide APIs to the applications.

Most notable APIs include the Microsoft CAPI and the X/Open GSS-API and GCS-API for Unix. Subsystem libraries are typically organized into application programming interfaces and, shielded through the operating system 57, a cryptographic service provider module.

The subsystem libraries may also hide the security APIs completely from the application. This allows existing applications to take advantage of the solution without being modified. An example is the integration of the security features into transport level software subsystems.

Other elements of this layer provide APIs for accessing the cryptographic unit secure storage and execution facilities. For example, a database API such as the ODBC interface could be offered, along with a data manager module inside the cryptographic unit to provide a tamper resistant database.

Operating Systems And Drivers. The operating system 57 performs two primary tasks. One task is to isolate the subsystem programming interfaces from the cryptographic service providers. The other task is to provide the necessary hardware control through a set of drivers which interface with the cryptographic hardware in form of hardware drivers.

Cryptographic Unit Subsystem. This layer 59 contains the hardware implementation and firmware elements of the cryptographic functions. The hardware typically comes in several form factors, such as a PCI card or a PCMCIA card, to accommodate the different hardware platforms and performance requirements. The firmware is a set of libraries which implements a micro-kernel, e.g. runtime, and the framework functionality, as well as user downloadable software modules required by a particular application programming interface.

Administration. The administration element 54 provides a management framework for the entire solution. This includes, for example, middleware components for administrative functions such as certificate management, application class of service management, and downloading of application specific extensions to the cryptographic unit.

The framework introduces the concept of policy driven cryptography. Application programming interfaces allow selection of desired services based on the application certificate. This is in contrast to currently available cryptographic programming interfaces. Most of the currently available cryptographic APIs are built around the concept of a cryptographic context. Applications establish this context before they can use any cryptographic service. For example, the Microsoft CAPI offers a programming interface that allows selection of a cryptographic service provider (CSP) type, and loads the software module into the system. An application can make calls to the CSP and use its services from that point on. There are however, no methods to distinguish cryptographic functions based on what the application is doing.

The invention implements a scheme by which the application is identified when a certificate proves the identity of the application and determines the available classes of service allocated to that application. There several methods for making the certificate available to the cryptographic unit.

Certificate passed in each call. The certificate can be passed in each call to the CSP. This scheme allows for an application which may pass more than one certificate to pass the appropriate certificate for the task that is to be accomplished. For example, if an application is allowed to use strong encryption for financial transactions and at the same time weaker encryption for E-mail functionality, that application can select dynamically the level of cryptography by passing the corresponding certificate.

Certificate passed at initialization time. The certificate can also be passed when the link to the CSP is established. An application using multiple certificates could establish multiple contexts, one for each certificate, and use the appropriate one in the cryptographic function calls.

Certificate implicitly available. The certificate is transparently available to the cryptographic layers. For example, the application passes its name, which is used to index into a registry that contains the certificate for the application.

The invention implements a policy scheme in which the application requests a class of services which ultimately defines the level of cryptography allowed in the application. Key elements in this process include the application certificate, the class of service, and the domain authorities that manage them.

FIG. 6 shows a high level view of these elements. In the figure, there are two domain authorities. The security domain authority (SDA) 62 is responsible for granting a set of classes of service (COS) 63 to the application domain authority 60 (see, for example U.S. patent application Method and Apparatus for Trusted Processing, Ser. No. 08/702,322, filed Aug. 23, 1996, now U.S. Pat. 5,815,575,. The SDA is also responsible for issuing policy cards 12 which contain the COS information and the touchpoint data for the cryptographic unit 14. The SDA manufactures this information upon request from the site which installs the cryptographic unit into a host system 16.

The application domain authority (ADA) 60 receives the COS elements granted by the SDA. The ADA has responsibility for issuing application certificates 64 to the applications 65 that belong to its domain. An application certificate contains the application ID 67 and the granted COS 68 by the ADA.

Applications receive a certificate from the ADA which they need to present to the cryptographic unit 14 to get the desired COS level. The cryptographic unit, upon receiving the request, uses the certificate to determine whether the application has the right to access the requested cryptographic function. If the COS requested through the application certificate matches the COS granted by the SDA to the ADA and stored in the policy card, the request is handled, otherwise it is not handled.

The touchpoint data 69 are the information stored on the policy card which enable the cryptographic hardware for the defined classes of service. Periodically, this information need to be recomputed by the cryptographic unit and validated by the policy card. Any mismatch, causes the cryptographic capability of the cryptographic unit cease to exist.

The network security server (NSS) 18 acts as an on-line instrument for policy negotiation and changes to the policy information stored on the policy card. If, for example, adding a class of service to the set of services normally requires the issuance of a new policy card with the changed information. Alternatively, the NSS could perform the update of the policy card on behalf of the SDA. It is important to note, that to prevent a malicious application from using a certificate in an unpermitted way, applications need to be tightly bound to their certificates.

The invention provides a method of validating that an application rightfully executes a certain level of cryptography as it was granted by the application domain authority, in form a certificate containing the valid class of services. A tight binding of the application to this certificate is therefore a key aspect of the invention. The process of establishing this trust is referred to as application certification throughout this document.

FIG. 7 is a block diagram that illustrates the certification requirements of a framework according to the invention. Application certification describes two major elements of establishing trust between the application 65 and the cryptographic unit 14, i.e. is the application a valid application (72) and is the cryptographic unit a valid cryptographic unit (74):

The first part deals with the process of analyzing a piece of data to determine that it has not been tampered with.

In general, two main classes of objects are of interest:

The first class deals with the subject of program image certification.

The second class generalizes the process and applies the concept to a variety of data objects.

The characteristics of the cryptographic unit, namely a tamper-resistant functional unit, allow for the construction of general certification methods of arbitrary data objects (see, for example U.S. patent application Method and Apparatus for Trusted Processing, Ser. No. 08/702,332, filed Aug. 23, 1996, now U.S. Pat. No. 5,815,575.

The second part views the framework from an application perspective, i.e. the application must be assured of the identity of the cryptographic unit. The process of establishing this kind of trust is referred to herein as cryptographic unit validation. Cryptographic unit validation deals with the process of assuring to the application that the cryptographic unit has not been tampered with, i. e. has been replaced with a bogus cryptographic unit. After the process of cryptographic unit validation, the application can assume that the correct cryptographic unit is performing the requested cryptographic services.

For critical applications, there has long been a need to validate that an application has not been tampered with. Performing this validation usually involves a trusted load subsystem. A trusted load subsystem is the part of the operating system which is responsible for loading a program image into the system memory space and while doing that validate that the application has not been tampered with. Mechanisms, such as a checksum over the program image, are often used for this purpose. If the checksum does not match the checksum stored by the loader subsystem at application installation time, the load fails and the program image is not loaded.

A trusted loader subsystem cannot exist independently from a relationship to the operating system. Trusting the loader to validate that the application has not been tampered with, implies that the operating system trusts the loader. A trusted kernel which is validated at system boot time, usually by a piece of hardware, builds the core of the trust hierarchy on which the application runs.

Validating a code image to determine the rightful usage of a certificate can be generalized to validating any object governed by a certificate. For example, an Internet applet, as they are provided for World Wide Web applications through the JAVA programming language, could also take advantage of the scheme described herein. Thus, any object to be used or accessed could be accompanied by a certificate. The validation step is very similar to the steps performed by a trusted load subsystem for code images.

Cryptographic unit validation describes the process by which the application requesting cryptographic services is assured about the identity of the cryptographic unit. There are several methods which can accomplish this task.

Challenge the cryptographic unit. In this method, the application issues a puzzle to the cryptographic unit that only the cryptographic unit can resolve. The fact that the cryptographic unit can solve the puzzle is proof of the identity of the cryptographic unit.

The cryptographic unit prepares the application to function. In this approach, the application is shipped to the target system in a scrambled form. For example, the binary image could be encrypted. Only a cryptographic unit that has the correct decryption key can unscramble the application, and hence is a valid cryptographic unit.

The second method has additional applicability for software copyright schemes. Sending the application in encrypted form to the target side and letting the cryptographic unit decrypt the program does not only reveal that the cryptographic unit is a valid cryptographic unit, but also allows the software manufacturer to send out an application tailored to that particular cryptographic unit, i.e. host system. Unfortunately, once decrypted the application image is available in the clear, it can be copied to other systems with little or no effort.

The invention includes a method, that is referred to herein as software level touchpoints, which addresses both of the cryptographic unit validation aspects, as well as copyright protection schemes. The concept of software level touchpoints is explained in greater detail below.

Application certification is the process of ensuring that there is a tight binding between the application image and the application certificate issued by the application domain authority. The process of application certification can be described in two distinct stages. They are the installation stage and the execution stage. The following is a brief description of these stages.

Installation stage. The installation stage describes the steps necessary to introduce the application and the accompanying certificate to the cryptographic unit.

Execution stage. The validation stage describes the steps taken to validate the application's identity, based on the certificate passed along with the validation request. After successful validation, the application enters the execution stage. At any time during this stage, the cryptographic unit can issue a validation request to revalidate the application's claim.

Figure 8:
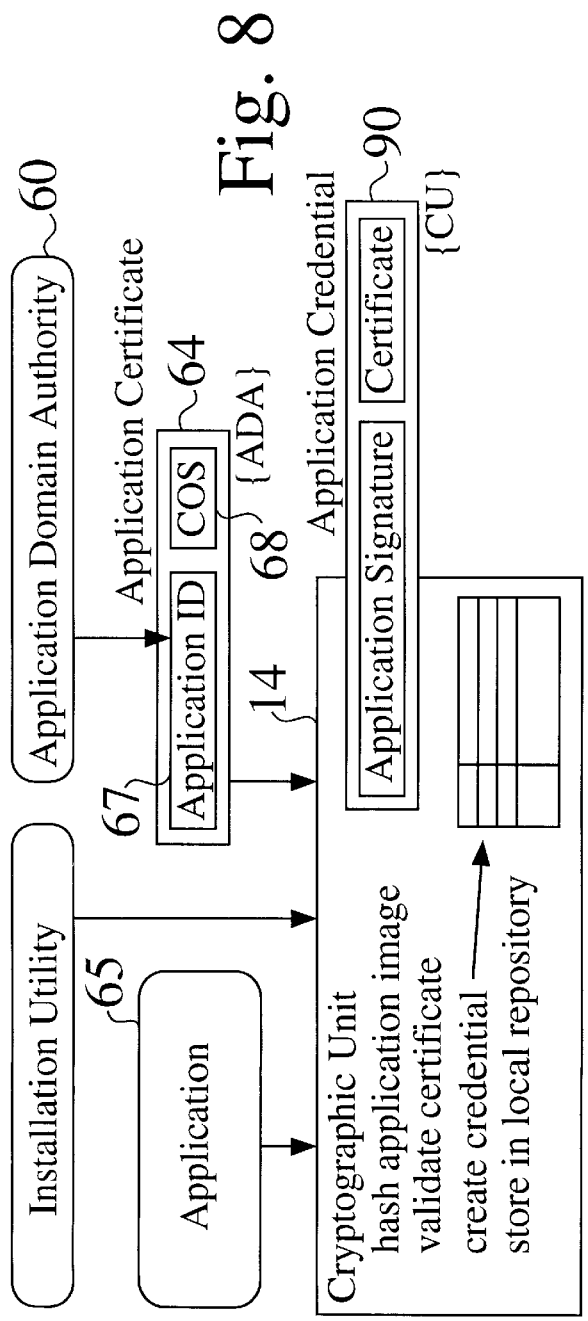
FIG. 8 is a block schematic diagram that illustrates the flow of events by which an application introduces itself to a cryptographic unit according to the invention.

FIG. 8 illustrates the flow of events by which an application introduces itself to a cryptographic unit according to the invention. Certified applications are introduced to the host system at the application installation stage. A certified application consists of the application image, i.e. the code file 65 and the certificate 64 issued by the application domain authority 60. The result of the installation stage is an application credential 90 which uniquely denotes the application, the cryptographic unit, and the valid classes of services. The result is referred to herein as an application credential.

The purpose of the install process is to introduce the application to the cryptographic unit. A special utility program, the install program, is called to carry out the necessary work. The main task this utility performs is to pass a reference to the program image and the application certificate to the cryptographic unit.

Upon receiving the request for installation, the cryptographic unit uses its host system memory access capabilities to compute a hash value from the program image. The application certificate contains the among other information the class of service defined for this application. Using these two elements of information, the cryptographic unit produces a credential which identifies the application, e.g. through a name, the hash value of the application image, and the class of service defined for the application.

The credential is then signed by the cryptographic unit and stored in local nonvolatile memory inside the cryptographic unit. If desired, the credential is also exported to an external area. Because the credentials are only useful to the cryptographic unit that generated them, it only needs to be ensured that the credentials have not been tampered with while outside the cryptographic unit boundaries.

In the execution stage, an application is loaded by the operating system into the memory system and starts execution. At some point in the application execution, the application asks for cryptographic services. Typically, the first step is to establish a context with the cryptographic unit. An application passes the application certificate issued by the ADA to the cryptographic unit when it establishes a logical association, e.g. a cryptographic context.

Figure 9:
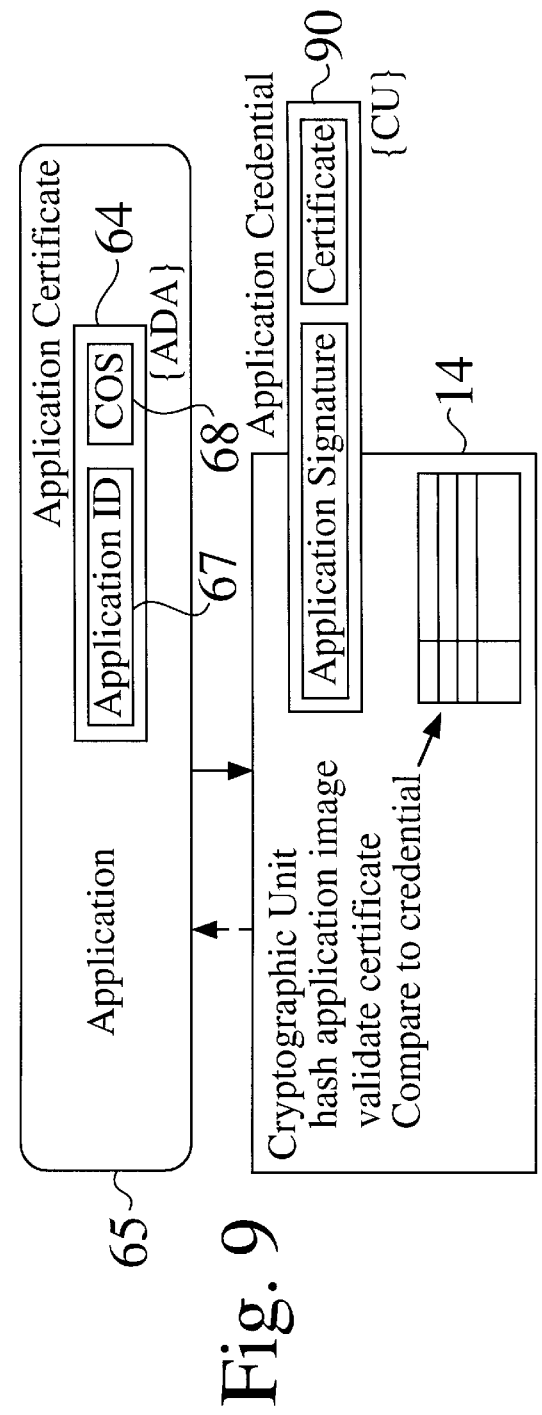
FIG. 9 is a block schematic diagram that illustrates the steps executed during the execution stage according to the invention.

FIG. 9 illustrates the steps executed during the execution stage according to the invention. The cryptographic unit 14, upon receiving the request of establishing an association, needs to validate the identity of the application based on the certificate passed. Through the operating system components, the cryptographic unit has access to the application image, and is therefore able to compute the signature of the application. For example, using the DMA capability and the knowledge of the memory address range of the application within the memory system, the cryptographic unit can compute a hash value.

After validating the correctness of the certificate, the cryptographic unit uses the certificate to locate the application credential corresponding to the certificate. The credential contains, among other information, the computed signature of the application image from the installation process described above. If the values match, two important facts can be deduced:

First, the application's identity is established because the computed signature over this image matches the computed signature at installation time.

Second, the application has not been tampered with since the installation stage.

After this initial validation step, the application can issue calls to the cryptographic unit requesting cryptographic operations. At any time later on, the cryptographic unit may decide to execute the validation process again. The options range from validating on a periodic base to validating on each request.

From an operating system perspective, no changes to the loader and the operating are required to implement this scheme. The only requirements needed are the ability to access the memory image of an object. Implementations may however decide to invoke the cryptographic unit at application load time to perform the validation step.

The scheme described above is readily extended to cover not only code images, but also any kind of data object which can make use of the validation method outlined. For example, the operating system itself, subsystem libraries, and static configuration information could be protected from unauthorized modifications or replacement by using the scheme described herein.

Software touchpoints are areas of data that are not usable to the host system environment until preprocessed. One example of a software touchpoint includes the instruction sequences in a code image which have been transformed in a way such that the instruction fetch unit of the host system cannot decode them successfully. Similarly, there could be data areas which have been altered in a way that the original data is not accessible.

Figure 10:
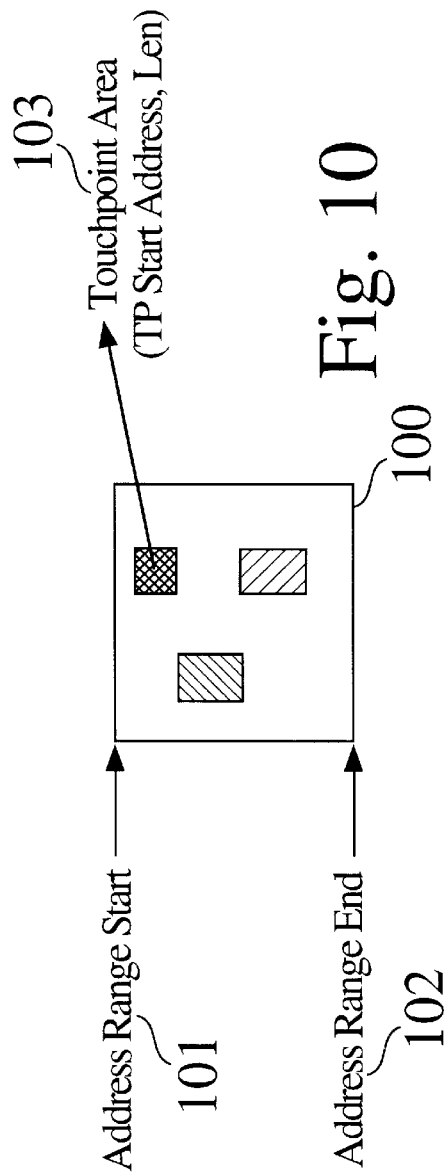
FIG. 10 is a schematic representation of a software touchpoint according to the invention.

FIG. 10 is a schematic representation of a software touchpoint according to the invention. A software touchpoint 100 is characterized by a starting address 101 within the address range of the object and the length of the touchpoint. There are several classes of software touchpoints:

Data level touchpoints describe an area inside a data object. No further information about the touchpoint is recorded in the data object about this touchpoint. A separate area describes these touchpoints outside of the data object.

Instruction level touchpoints describe touchpoints inside an instruction stream. There are two sub classes.

The first subclass describes instruction level touchpoints similar to their data level counterparts. In this case, an area in the instruction stream is replaced by the touchpoint information.

The second subclass describes instruction level touchpoints that have a structure. A structured touchpoint starts and ends with a special instruction which demarcates the touchpoint area 103.

All these types of touchpoints are described in more detail below.

The are two types of instruction level touchpoints:

The first type of instruction level touchpoint implements an instruction level touchpoint as a data area in the instruction stream which has be replaced by a scrambled version. No further information is available about the touchpoint at the location itself.

The second type of instruction level touchpoint implements the touchpoints with a distinct instruction at the beginning and an instruction at the end of the touchpoint area. To distinguish the two touchpoint areas, the first type of touchpoint is referred to herein as an unstructured touchpoint, while the second type of touchpoint is referred to as a structured touchpoint.

FIG. 10 is a schematic representation of a software touchpoint according to the invention. The touchpoint 103 is situated within a software object 100 having an address range start 101 and an address range end 102.

Figure 11:
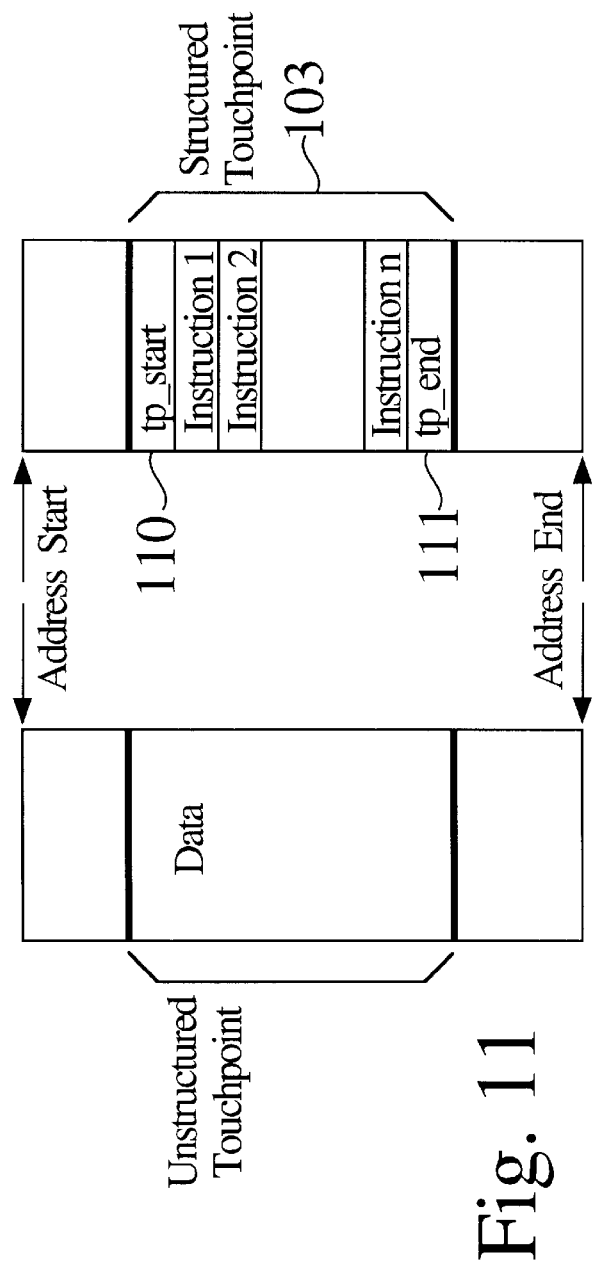
FIG. 11 is a schematic representation of a unstructured and a structured instruction level software touchpoint according to the invention.

FIG. 11 is a schematic representation of a unstructured and a structured instruction level software touchpoint according to the invention. For example, a tp_start 110 and tp_end 111 instruction could demarcate a touchpoint area 103. The information between is the touchpoint data to be transformed to the original instruction sequence. In the case of an instruction level touchpoint, the data between comprises instructions. The demarcation instruction could trap to the cryptographic unit to resolve the touchpoint area and put it back into place again after the instruction sequence has been executed. The sequence of instructions inside the demarcated area is a sequence of instructions which should be executed atomically. By this, it is ensures that, except for operating system exceptions, no other code can be executed which could have access to the touchpoint area 103.

Alternatively, this touchpoint may be implemented as a decoding function inside the instruction fetch unit of a CPU. A policy register could store the necessary decoding key for this application in a context switch. Benefits of this approach include the transparency of the touchpoint, combined with the benefit of making the code unusable for another system.

Similar to the unstructured instruction level touchpoint, any kind of constant data can be protected by this scheme.

Cryptographic Unit Validation Process. Applications need to be assured about the correctness of the cryptographic unit. The objective is to avoid the scenario in which application requests are redirected to a different cryptographic function. The cryptographic unit validation process describes the steps taken to assure the application about the identity of the cryptographic unit. The validation process described below uses the software level touchpoints herein described.

Cryptographic unit validation proceeds in three distinct stages:

Manufacturing stage. The manufacturing stage describes the steps that need to be taken at the application manufacturer side to create an application having the software level touchpoint information incorporated therein.

Installation stage. The installation stage describes the steps necessary to introduce the application and the accompanying certificate to the cryptographic unit. Depending on the type of installation, the software level touchpoints may be removed at this stage or left intact within the application image to be resolved at execution time.

Validation stage. The validation stage describes the steps taken to validate the applications identity based on the certificate passed along with the validation request. After successful validation, the application enters the execution stage (discussed above). At any time during this stage, the cryptographic unit can issue a validation request to revalidate the application's claim. In addition to these application certification steps, the software level touchpoints installed in the application need to be removed or transformed dynamically as they are encountered by the host system processor. This is only the case if they have not been removed during the installation stage.

The cryptographic unit validation process outlined below allows for additional benefits that go beyond the main goal of cryptographic unit validation. From a software manufacturers perspective, copyright protection is becoming increasingly critical in a networked world. A software manufacturer therefore would like to be assured that the software shipped to a customer is not copied to another system. The range of requirements can range from ensuring that the software is loaded to only a valid group of authorized systems to customizing the software for exactly one system.

Figure 12:
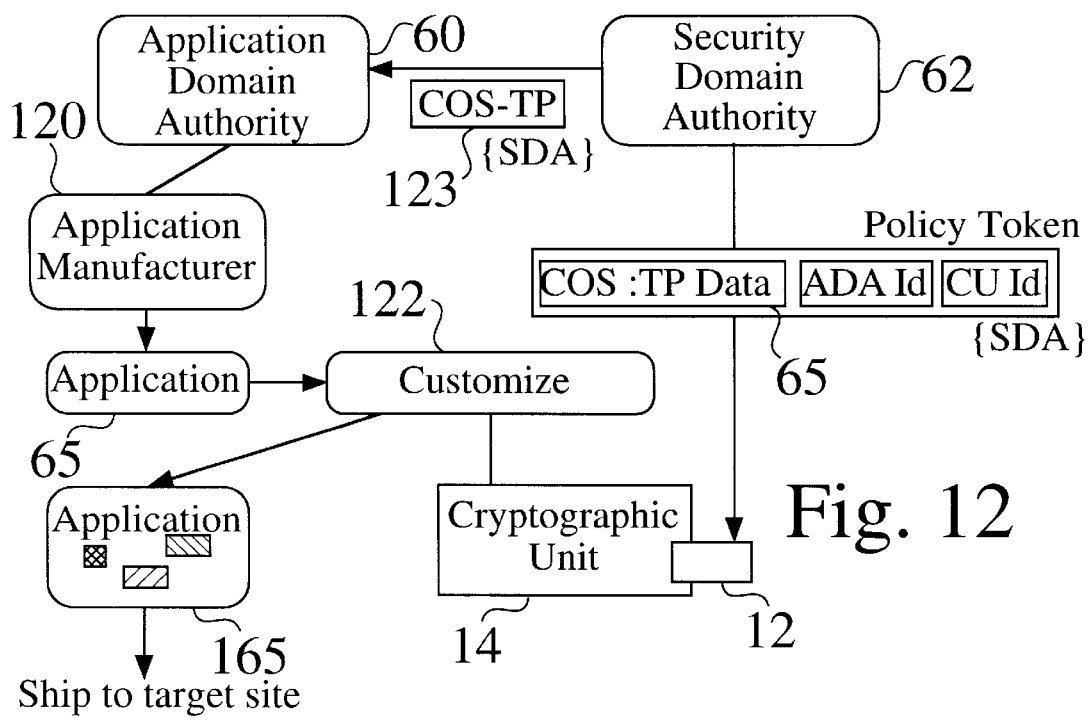
FIG. 12 is a block schematic diagram that illustrates the steps executed during the manufacturing stage according to the invention.

FIG. 12 is a block schematic diagram that illustrates the steps executed during the manufacturing stage according to the invention. In the manufacturing stage, the application 65 is produced by the application manufacturer 120. The objectives are to build an application which can be tailored for the particular group of target systems or a single target system. Target system is identified by the cryptographic unit installed therein.

The application manufacturer first develops the application. This is the executable version of the application for the target host system platform. Before the application can be shipped to the target host system, a customize step 122 installs the software level touchpoints. After the installation, the application 165 is shipped. The customize component shown in the figure above is responsible for installing the touchpoints in the application image.

The ADA is the domain authority in which the application manufacturer resides. The ADA 60 is granted a class of services 123 by the SDA 62 which define the function used to install the touchpoints into the application image.

Part of the touchpoint installation is to produce a list of locations and lengths of the touchpoint areas within the code image. In the case of unstructured instruction level touchpoints, this information is needed to locate the touchpoints. For structured instruction level touchpoints, this information is not strictly necessary. There are also considerations concerning exactly where a touchpoint could be placed and what the length of the sequence should be. For unstructured touchpoints the question of where exactly they are placed in the code image is of no real importance.

Technically the touchpoints can be placed into any area of the image. For structured touchpoints, there are more constraints. Restrictions could be that touchpoints should for example not cross procedure boundaries, or do overlay more than one basic block of instructions. The restrictions depend on the nature of the hardware level support for structured touchpoints. Some of these aspects are discussed below in connection with hardware support for software level touchpoints.

At the end of the manufacturing stage, there is an application image augmented with software level touchpoints. The touchpoints are put into the image in a rightful way because the COS was enabled for the cryptographic unit by the customized component in accordance with rights granted by the SDA to the ADA of the application manufacturer. This process, at this point, does not involve information about the target system. Any installation which has the capabilities to reverse the touchpoint information install process can derive a working application. A further tailoring down of the target system, would require additional knowledge about this system. Because this introduces a tighter dependency between the manufacturer and the target recipient, a higher effort is necessary on the administration side.

This following discussion first introduces the more general case of a certain level of independence between the manufacturer and the target system. Thereafter, the topic of this tight binding is discussed in more detail.

The installation stage describes the steps taken at the target site, i.e. the host system with a specific cryptographic unit, that are necessary to prepare the usage of the application on this system. Again, there are several objectives.

The first objective is to ensure that an application is assured about the integrity of the cryptographic unit. This assurance is achieved by that fact that only a cryptographic unit which was granted the necessary COS to process the application image is able to transform this image in to a usable one successfully.

The second objective is to ensure that once an application is installed on the target system it is only usable by this system and cannot be copied to another system.

Figure 13:
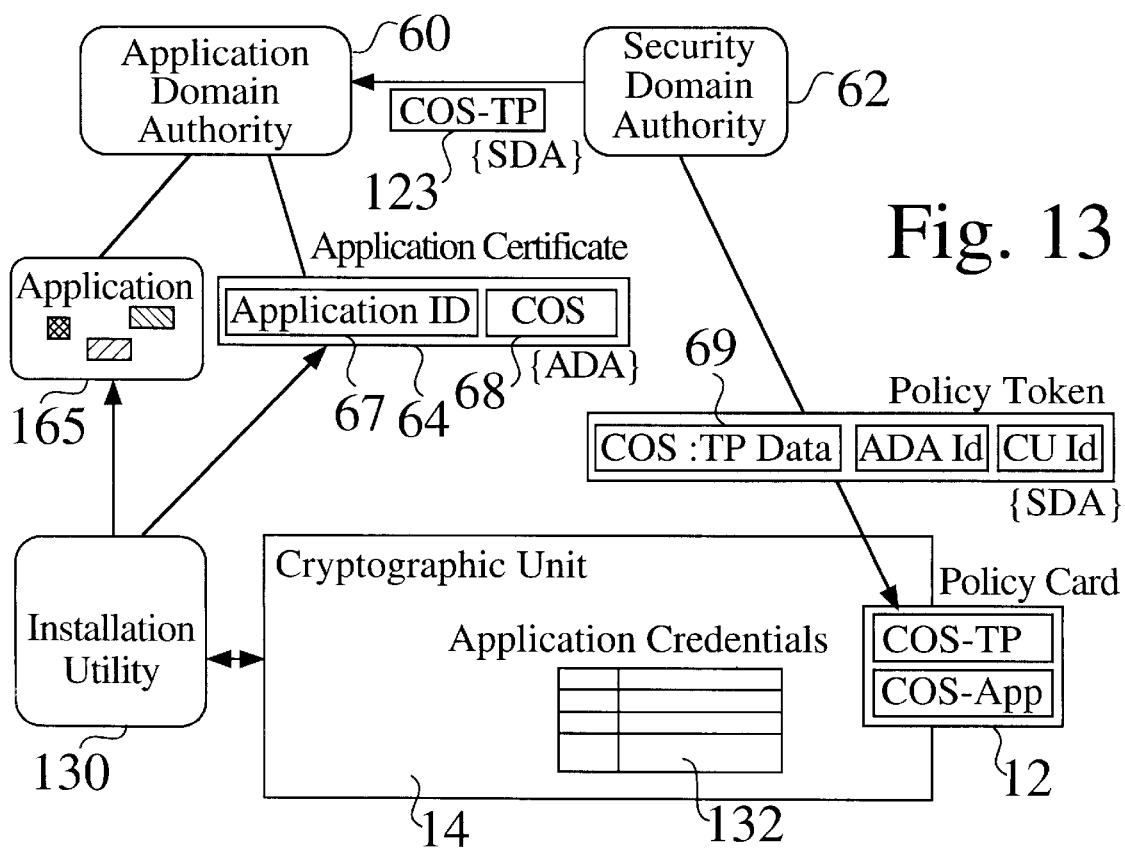
FIG. 13 is a block schematic diagram that illustrates the steps executed during the installation stage according to the invention.

FIG. 13 is a block schematic diagram that illustrates the steps executed during the installation stage according to the invention. The installer component 130 is responsible for installing the application in the target system. As a part of the install process, the application's credential 132 which describes the COS is created. The details of this process have been explained above in connection with application certification. The other part of the install process performs the steps necessary to prove that this is a valid cryptographic unit and to build an application image which cannot be used other than in combination with the cryptographic unit that was used by the install process.

The SDA 62 grants the ADA 60 the set of COS 123. The ADA grants the application rights to a set of COS. The policy 12 contains the valid COS for the ADA and the COS for the installer as it was granted to the ADA of the application manufacturer. The installation component 130 can therefore only process the touchpoints in the application image if it was granted the COS to do so.

Touchpoints can in theory be removed at the installation stage. However, removing them from the application image at this stage has two consequences. First, the application has only the one time assurance that the cryptographic unit is a valid cryptographic unit at installation time. After the removal of touchpoints another cryptographic unit could be installed along with another policy card or be bypassed when the application requests cryptographic services. Second, without the touchpoints the application is in the clear and can be copied and executed on any other system. To prevent these scenarios, the touchpoint should be removed as late as possible in the execution cycle.

In the execution stage, the application runs on the host system. The operating system loader transforms the application file image into the executable memory image. One part of the process deals with the requirement of validating that the application has not been tampered with since installation time and rightfully requests a certain class of service. The steps taken to ensure this have been described above in connection with application certification. For the cryptographic unit validation portion, additional steps are required.

Figure 14:
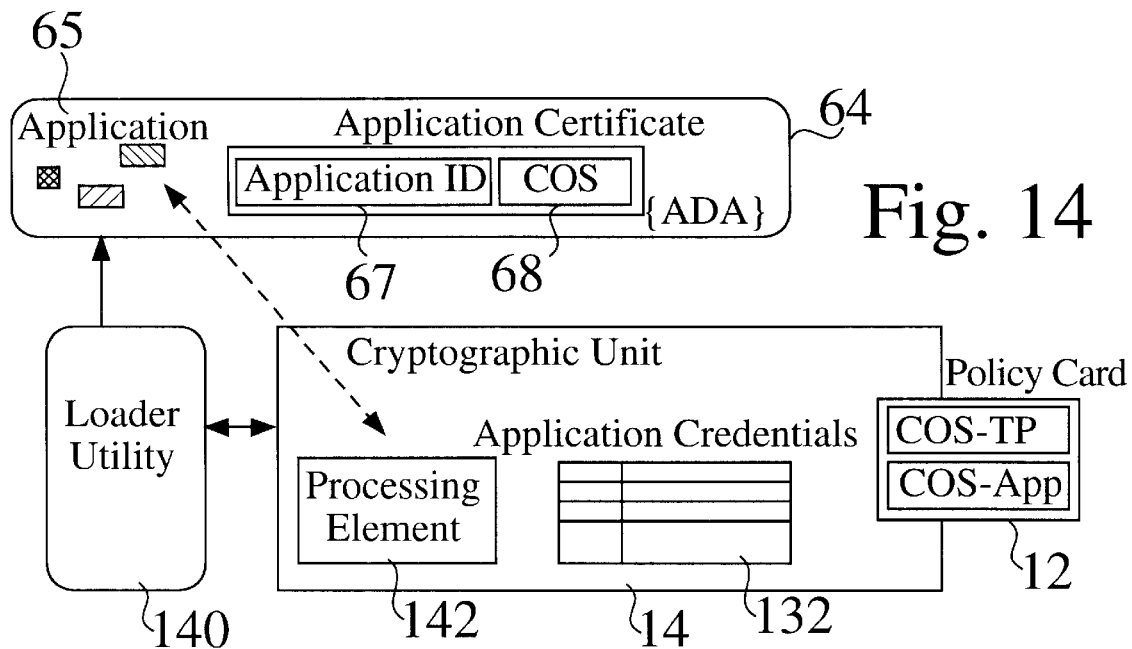
FIG. 14 is a block schematic diagram that illustrates the steps executed during the execution stage according to the invention.

FIG. 14 is a block schematic diagram that illustrates the steps executed during the execution stage according to the invention. At application load time (via a loader utility 140 and a processing element 142) two main objectives need to be addressed. The first objective to validate the cryptographic unit. This task is accomplished by means of the cryptographic unit 14, which is able to resolve the software touchpoints from the application. For, example if the cryptographic unit is able to compute the original signature of the application without the touchpoints, it proved that it can successfully remove them and is therefore a valid cryptographic unit because it was granted the COS to perform this operation. The second objective is to resolve the touchpoints. The cryptographic unit is responsible to remove the touchpoints before the application portion that contains them is executed.

The simplest case is for the cryptographic unit to remove the touchpoints from the application code image. The file image of the program still contains the touchpoints and stays useless if copied to another system. The memory portion is however in the clear and could be copied if a malicious user writes a copy program which constructs the file image from the memory image. Such a task would require some skill set and knowledge of the underlying operating system, but is not impossible.

Another approach is to leave the touchpoints in place and resolve them as they are encountered. This approach relies on some hardware support to detect the touchpoints. Scenarios for this kind of touchpoint resolution are described above in connection with hardware support for software level touchpoint.

Tailoring To A Unique Cryptographic Unit. The process described so far does not establish a close relation between the software manufacturer's software component and the target system identified by the cryptographic unit in which it is installed. The benefit of the rather loose coupling permits the manufacturer to produce an application which can be installed on any system that has the capability to process the touchpoints installed inside the application. No further knowledge about the target system is required.

If a more tight binding is desired, the application manufacturer needs to tailor the application component to the target system cryptographic unit. This could be done, for example, by creating a unique COS which is shared between the manufacturer's ADA and the SDA. The SDA installs the unique COS on the policy card when it is customized for the target system cryptographic unit, and shares that COS with the ADA of the application manufacturer. Only the installation utility on the target system which is granted that unique COS can successfully install the software on the target system.

Figure 15:
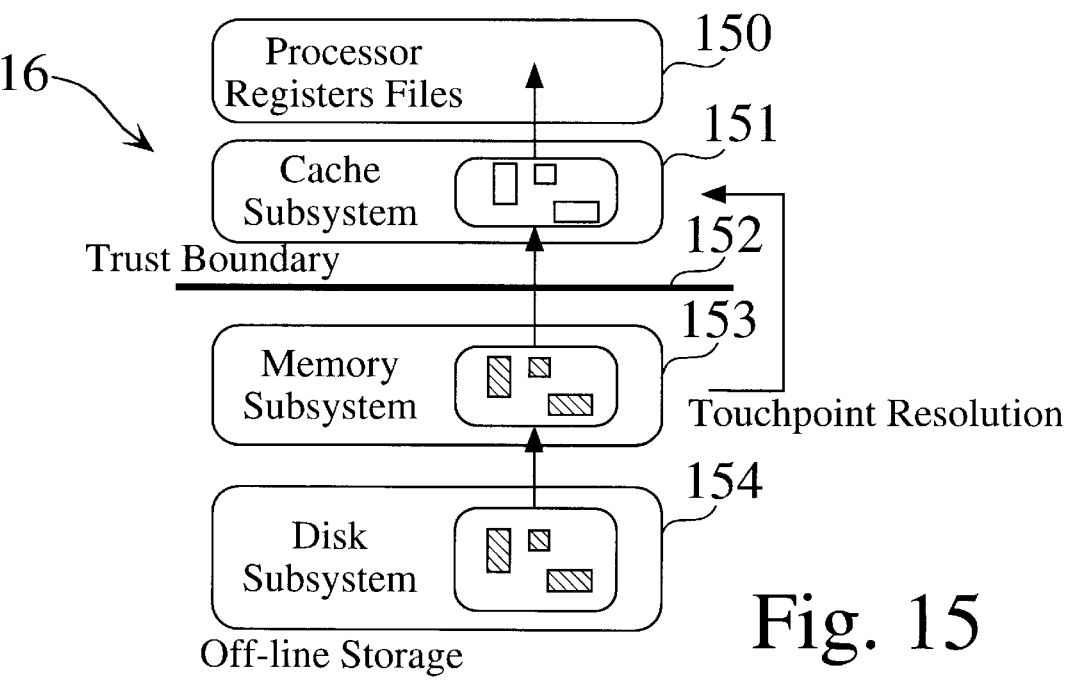
FIG. 15 is a block schematic diagram that illustrates the memory hierarchy with respect to the software touchpoint resolution according to the invention.

Host System Hardware Support for Certification and Cryptographic Unit Validation. Software level touchpoints can take advantage of hardware support from the host system CPU. FIG. 15 is a block schematic diagram that illustrates the memory hierarchy with respect to the software touchpoint resolution according to the invention. The host system 16 includes processor registers files and a cache subsystem 151 that are separated by a trust boundary 152 from a memory subsystem 153 and a disk subsystem 154. It should be appreciated that the system architecture shown herein is provided for purposes of example and that the invention is readily applied to other system architectures.

The following describes the host system processor mechanisms needed to support an implementation. The main concept is to bring the resolution process of touchpoints closer to the host system processor execution elements. By moving the resolution process close to the processor, e.g. the cache subsystem, no touchpoint areas in the clear are in the main memory system or storage elements at a lower level in the memory hierarchy.

There are two main approaches for dealing with software level touchpoints:

In the first approach the host processor generates an exception upon detection of a software touchpoint which invokes the cryptographic unit to resolve the software touchpoint.

The second approach is similar to the first approach, except that it uses the host system processing elements for the actual operations.

Both approaches can further be subdivided according to structured versus unstructured software touchpoint.

The Trap to Cryptographic Unit Approach for Structured Instruction Level Touchpoints. In the trap to cryptographic unit approach, the host system processor raises an exception when encountering a touchpoint start instruction. The exception handler invokes the cryptographic unit component to remove the touchpoint and replace the touchpoint data with executable instructions. The host system processor then continues to execute the application. Upon detecting the touchpoint end instruction, the host system processor traps again and the cryptographic unit can transform the memory image back to the touchpoint state.

Figure 16:
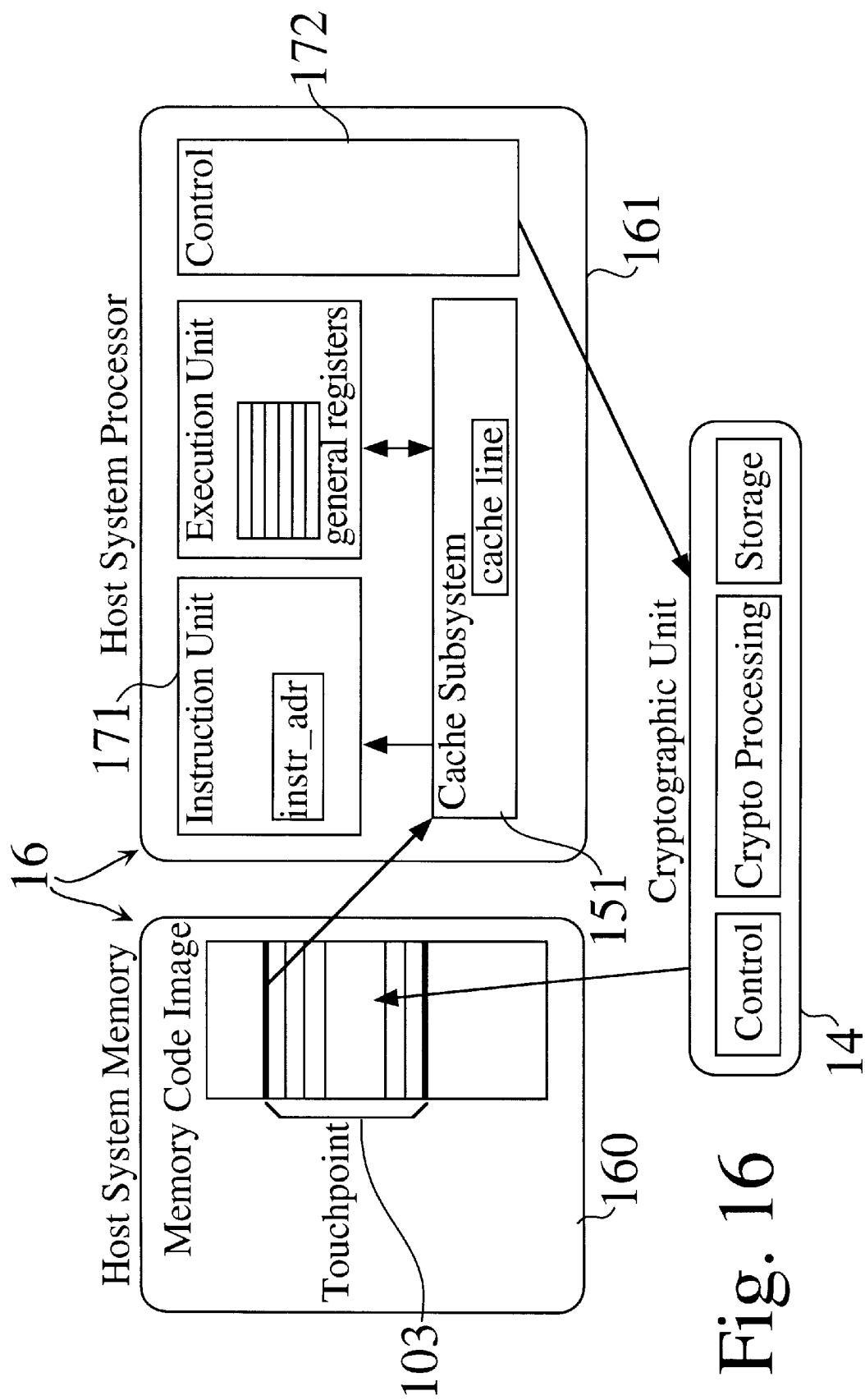
FIG. 16 is a block schematic diagram that illustrates the memory hierarchy with respect to the software touchpoint resolution according to the invention.

FIG. 16 is a block schematic diagram that illustrates the memory hierarchy with respect to the software touchpoint resolution according to the invention. The host system processor 161 uses the tp_start instruction to raise an exception which causes the cryptographic unit 14 to be invoked. The cryptographic unit is then given the knowledge of the memory address range and the memory location of the touchpoint 103, and transforms the touchpoint body into an instruction sequence which can be executed by the host system processor. Control then returns back to the host system processor.

Once the touchpoint is translated in this fashion, other application instances could potentially access the touchpoint area. It is therefore important to implement the touchpoints as a critical section which no application context switching allowed inside this section. Upon ending the touchpoint instruction sequence, the tp_end instruction causes a trap to the cryptographic unit which allows the cryptographic unit to reverse the touchpoint data back to its original state.

Use of Host System Processor Elements for Structured Instruction Level Touchpoints. This approach assumes that the host system processor has a built in logic component which allows it to transform the decode the touchpoint during instruction fetch. Upon encountering a touchpoint start instruction, the host system processor translates the touchpoint data within the processors cache and continues the execution. No memory image changes take place. Upon encountering the touchpoint end instruction, the cache line is flushed or left for future use. To support this scheme, touchpoints are required to align on a cache boundary and be a multiple of the cache line size.

Figure 17:
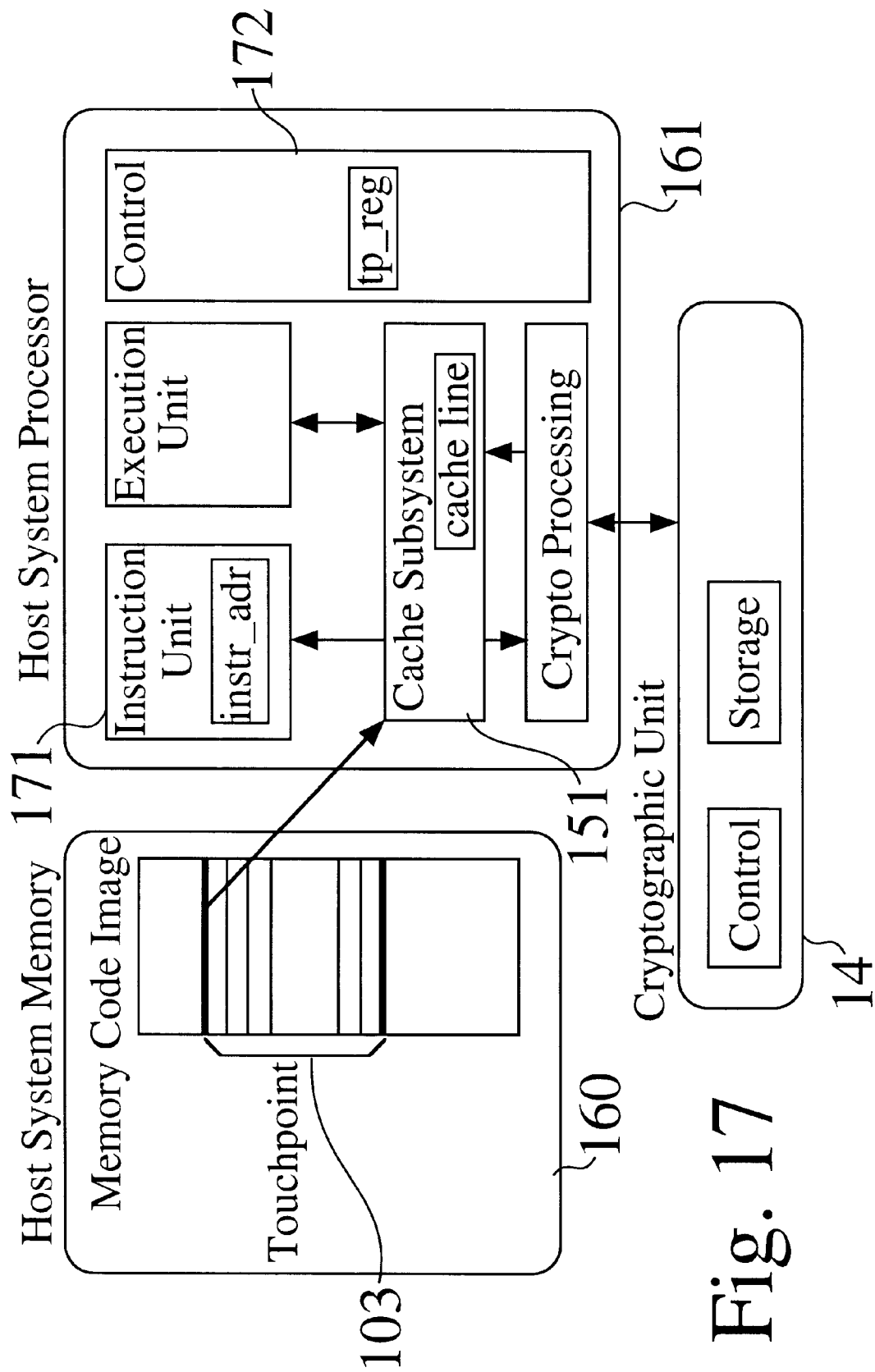
FIG. 17 is a block schematic diagram that shows instruction level touchpoint support inside the host system processor according to the invention.

FIG. 17 is a block schematic diagram that shows instruction level touchpoint support inside the host system processor according to the invention. Upon detecting a tp_start instruction by the host system processor instruction fetch unit 171, the host system first fetches, and then transforms, one or more cache lines that contain the touchpoint area using the key stored in a host system processor control register 172. Each application may have a different tp_reg value for resolving the touchpoint area. The tp_reg value is part of the COS-TP which is used to install the application in the host system. The loading of the tp_reg control register at context switch involves the cryptographic unit as the keeper of the information. The key_reg value could also be made part of the application context state, so that it can be loaded during a context switch without invoking the cryptographic unit.

Approaches for Unstructured Instruction Level Touchpoints and Data Level Touchpoints. Both unstructured instruction level touchpoints and data level touchpoints are characterized by the absence of any meta-information about the touchpoints at the touchpoint location itself. The approach for this class of software touchpoints can be subdivided into two steps:

The first step involves the detection of these touchpoints;

The second step involves resolving the touchpoints before the host system processor accesses that area.

To detect a touchpoint area, mechanisms have to be put into place in both the software environment and the hardware to propagate the information about the location of the touchpoints to the host system processing elements. For example, if the granularity of the touchpoint areas is chosen to be on a page size of the virtual memory system of the host system, the information about the touchpoint location could be communicated trough the page tables and translation look aside buffers to the host system processor.

During address translation, the host processor can detect whether the address range to be translated contains software touchpoints or not. When loading the cache line for execution or access from a touchpoint page by the host system processor, the touchpoint area is resolved in the cache subsystem (as described above). Similar techniques apply, in which the resolved touchpoint areas are kept in the cache lines and are not accessible in main memory or the disk images of the objects that contain them. Read only cache lines are flushed whenever they are no longer needed. Cache lines modified need to be transformed back before they are written back to the main memory system.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. An apparatus for certifying applications, comprising:
   a security domain authority for granting at least one class of service to an application;
   an application domain authority for receiving said class of service granted by said security domain authority; and
   at least one application certificate issued by said application domain authority to applications that belong to an application domain authority domain.

2. The apparatus of claim 1, said application certificate comprising:
   an application ID; and
   said granted class of service.

3. The apparatus of claim 1, further comprising:
   a processing unit for receiving said application certificate to determine whether said application has a right to access a requested cryptographic class of service.

4. The apparatus of claim 3, further comprising:
   a policy element that enables said processing unit for said granted class of service, wherein any mismatch between said policy element and said processing unit invalidates said processing unit.

5. A method of validating that an application rightfully executes a class of service as it was granted by an application domain authority, comprising the steps of:
   issuing an application certificate containing a valid class of services; and
   tightly binding said application to said application certificate to establish trust between said application and a target processor.

6. A method for processing unit validation in which an application that requests processing services is assured about the identity of said processing unit, comprising the steps of:
   challenging said processing unit; and
   issuing a puzzle to said processing unit that only said processing unit is able to resolve, wherein said processing unit's ability to solve said puzzle is proof of the identity of said processing unit.

7. A method for processing unit validation in which an application that requests processing services is assured about the identity of said processing unit, comprising the steps of:
   shipping said application to a target system in a scrambled form; and
   using said processing unit to prepare said application to function;
   wherein only a processing unit that has a correct key that is able to unscramble said application, thereby establishing that said processing unit is a valid processing unit.

8. A method for producing a certified application in which there is a tight binding between an application image and an application certificate issued by an application domain authority, comprising the steps of:

performing an installation stage that introduces said application and delivers an accompanying application certificate to a target processing unit;
performing a validation stage that validates said application identity, based upon passing said application certificate along with a validation request; and after successful validation; and
entering an execution stage during which said processing unit is able to issue a validation request to revalidate said application.

9. The method of claim 8, further comprising the steps of:
introducing certified applications to said target processor at said installation stage.

10. The method of claim 8, said certified application comprising:
said application image; and
said application certificate, which issued by an application domain authority.

11. The method of claim 8, wherein said installation stage produces an application credential which uniquely denotes said application, said target processor, and a valid class of services for said application.

12. The method of claim 8, further comprising the steps of:
receiving a request for installation;
computing a hash value from said application image with said target processor;
using said hash value and a class of service defined for said application certificate to produce an application credential that identifies said application.

13. The method of claim 12, further comprising the steps of:
signing said application credential with said target processor; and
storing said application credential in a local memory.

14. An apparatus for certifying applications, comprising:
an application domain authority for issuing at least one application certificate to at least one application that belongs to an application domain authority domain, said application certificate uniquely denoting any of said application, a target processor, and a valid class of services for said application; and
a target processor for receiving said application certificate to determine whether said application has a right to access a requested function.

15. The apparatus of claim 14, said application certificate comprising:
an application ID; and
a grant of said valid class of services.

16. The apparatus of claim 14, further comprising:
a security domain authority for granting at least one class of service to an application.

17. The apparatus of claim 14, further comprising:
an application domain authority for receiving a class of service granted by a security domain authority.

18. The apparatus of claim 14, further comprising:
a policy element that enables said target processor for a granted class of service, wherein any mismatch between said policy element and said target processor invalidates said target processor.

19. The apparatus of claim 18, wherein said target processor is a cryptographic unit that does not provide any cryptographic functions in the absence of said policy element.

20. The apparatus of claim 14, further comprising:

software touchpoints that are not usable by a host system environment unless they are transformed.

21. The apparatus of claim 20, said software touchpoints further comprising:

instruction sequences in a code image which have been transformed in a way such that an instruction fetch unit of said host system cannot decode them successfully.

22. The apparatus of claim 20, said software touchpoints further comprising:

data areas which have been altered in a way that original data is not accessible.

23. The apparatus of claim 20, said software touchpoints further comprising:

data level touchpoints that describe an area inside a data object.

24. The apparatus of claim 20, said software touchpoints further comprising:

instruction level touchpoints that describe touchpoints inside an instruction stream, where either of an area in the instruction stream is replaced by said touchpoint or said touchpoint is structured to start and end with a special instruction which demarcates a touchpoint area.

25. The apparatus of claim 20, said software touchpoints further comprising:

software level touchpoints that prevent an application image from being copied to another system.

26. The apparatus of claim 20, wherein said software touchpoints are used to allow installation of an application only on host systems that are identified by a target processor.

27. The apparatus of claim 20, wherein said software touchpoints are resolved in a host processing element.

28. The apparatus of claim 20, wherein said software touchpoints are resolved at a cache level in a host processing system memory hierarchy.

29. The apparatus of claim 20, said software touchpoints further comprising:

a structured software level touchpoint identified by a start/stop instruction pair.

30. The apparatus of claim 29, wherein said structured software level touchpoint identified by a start/stop instruction pair is executed as an atomic sequence of operations.

31. An apparatus for processing unit validation in which an application that requests processing services is assured about the identity of said processing unit, comprising:

means for challenging said processing unit; and means for issuing a puzzle to said processing unit that only said processing unit is able to resolve, wherein said processing unit's ability to solve said puzzle is proof of the identity of said processing unit.

* * * * *